US008897452B2

(12) United States Patent
Wu et al.

(10) Patent No.: US 8,897,452 B2
(45) Date of Patent: Nov. 25, 2014

(54) NETWORK HAVING MULTICAST SECURITY AND METHOD THEREFORE

(75) Inventors: John Wu, Eden Prairie, MN (US); Ryan Lee Hagelstrom, Chaska, MN (US); Edward Raymond Mandy, Victoria, MN (US); Ranga Sri Ramanujan, Medina, MN (US)

(73) Assignee: Architecture Technology, Inc., Eden Prairie, MN (US)

( * ) Notice: Subject to any disclaimer, the term of this patent is extended or adjusted under 35 U.S.C. 154(b) by 0 days.

(21) Appl. No.: 13/283,205

(22) Filed: Oct. 27, 2011

(65) Prior Publication Data
US 2013/0108050 A1    May 2, 2013

(51) Int. Cl.
*H04L 29/06* (2006.01)
*H04W 84/18* (2009.01)
*H04W 12/04* (2009.01)
*H04L 9/08* (2006.01)

(52) U.S. Cl.
CPC ............ *H04L 9/0833* (2013.01); *H04W 84/18* (2013.01); *H04W 12/04* (2013.01)
USPC ........................................................ 380/283

(58) Field of Classification Search
USPC ........................................................ 380/283
See application file for complete search history.

(56) References Cited

U.S. PATENT DOCUMENTS

| 2007/0143600 A1* | 6/2007 | Kellil et al. | 713/163 |
| 2008/0013740 A1* | 1/2008 | Sowa et al. | 380/286 |

OTHER PUBLICATIONS

Hester, J. et al., "An Implementation-Independent Threat Model for Group Communications", Data Mining, Intrusion Detection, Information Assurance, and Data Networks Security 2006, Proc. of SPIE vol. 6241, 6241M, (2006).
Kim, Y. et al., "Tree-based Group Key Agreement", ACM Transactions on Information and System Security (TISSEC), 2004.
Kim, Y. et al., "Group Key Agreement Efficient in Communication", IEEE Transactions on Computers, 2004.
McGrew, D. et al., "Key Establishment in Large Dynamic Groups Using One-Way Function Trees", IEEE Transaction on Software Engineering, 2003.
Mittra, S., "Iolus: A Framework for Scalable Secure Multicasting", Proceedings of ACM SIGCOMM '97, Cannes, France, pp. 277-288, 1997.
Hardjono, T. et al., "The Multicast Group Security Architecture", Network Working Group, Request for Comments: 3740, Mar. 2004, http://www.ietf.org/rfc/rfc3740.txt.
Arkko, J. et al., "MIKEY: Multimedia Internet KEYing", Network Working Group, Request for Comments: 3830, Aug. 2004, http://www.ietf.org/rfc/rfc3830.txt.

(Continued)

*Primary Examiner* — Kambiz Zand
*Assistant Examiner* — Michael Guirguis
(74) *Attorney, Agent, or Firm* — IPLM Group, P.A.

(57) ABSTRACT

A method for conducting encrypted communication in a network and a network having a plurality of nodes organized into a plurality of groups which initiates encrypted communication between a first one of the plurality of nodes of a first one of the plurality of groups and a second one of the plurality of nodes of the first one of the plurality of groups different from the first one of the plurality of groups using a group key and initiates encrypted communication between a third one of the plurality of nodes of the first one of the plurality of groups and a fourth one of the plurality of nodes of a second one of the plurality groups different from the first one of the plurality of groups using a session key.

33 Claims, 6 Drawing Sheets

(56) References Cited

OTHER PUBLICATIONS

Baugher, M. et al., "Multicast Security (MSEC) Group Key Management Architecture", Network Working Group, Request for Comments: 4046, Apr. 2005, http://www.ietf.org/rfc/rfc4046.txt.

Rodeh, O. et al., "Optimized Group Rekey for Group Communication Systems", NDSS 2000, pp. 37-48, 2000.

Wong, C. et al., "Secure Group Communications Using Key Graphs", IEEE/ACM Transactions on Networking, vol. 8, No. 1, Feb. 2000.

* cited by examiner

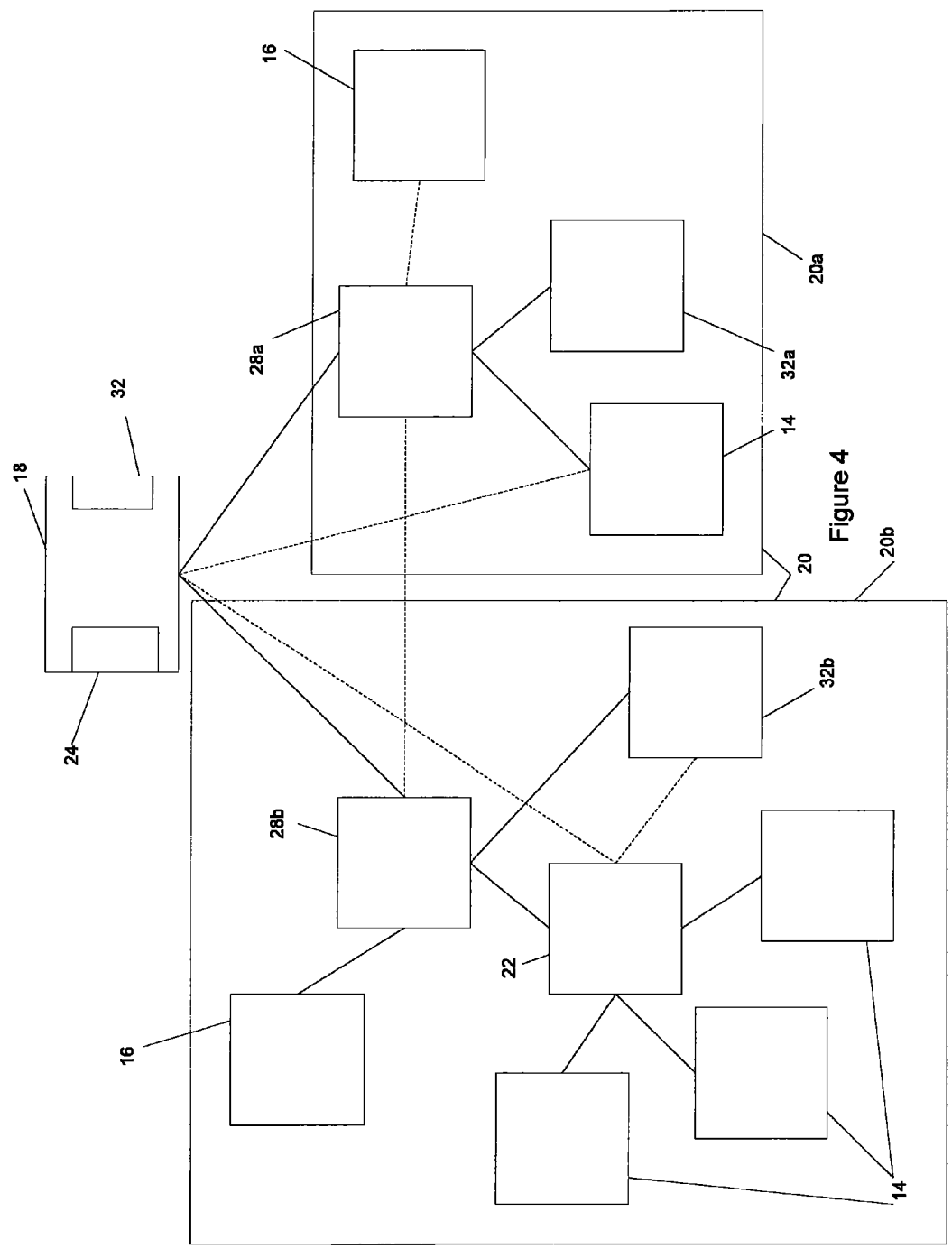

NETWORK HAVING MULTICAST SECURITY AND METHOD THEREFORE

STATEMENT REGARDING FEDERALLY SPONSORED RESEARCH OR DEVELOPMENT

This invention was made with government support under contract W15P7T-10-C-B012 awarded by the U.S. Army/Research Development and Engineering Command (RDECOM)/Communications-Electronics Research, Development and Engineering Center (CERDEC). The government has certain rights in the invention.

FIELD

The present invention relates generally networks and network communications and more particularly to such networks and network communications having encrypted communication between a plurality of nodes organized into a plurality of groups.

BACKGROUND

Communication networks are well known in the art. Multiple nodes may be incorporated into a common communication system for the purposes of exchanging data of various kinds. Such networks may exist for myriad purposes and incorporate anywhere from two nodes to thousands or millions of nodes. Communication media for the network may include physical connections, such as electronic wires and fiber optic cables, to wireless communications according to various standards.

Many such networks are relatively static in location and composition. Even when some nodes may physically move about and enter and leave the network, the variation in the network may be relatively slow in comparison to the speed of the network and the rate at which the network reasonably manages the nodes which comprise the network. Thus, many conventionally wired networks, as well as many networks which are wireless or which incorporate wireless communications links, do not pose unreasonable challenges in maintaining the integrity of the network even when nodes move about and enter and leave the network. Such networks may, as a consequence, maintain relative control over the membership of the network. This control may allow the network to be made relatively secure against threats such as eavesdropping and direct attack.

By contrast, relatively large networks with relatively mobile nodes may create management and security challenges. If nodes are moving and entering and leaving the network then the frequency of network management activities may increase. Moreover, in networks where security is of relatively high importance, maintaining adequate security in spite of nodes moving in and out of the network may become challenging. If new nodes join the network then the nodes need to be incorporated into the security system without compromising the security system. While if a node leaves the network then the node may still have details of the security system of the network which may fall into the possession of malicious actors. Networks operated by military or defense entities may be particularly prone to such challenges.

Furthermore, in organizations with a strong hierarchical organization may incorporate sub-networks or groups within a larger network. In such networks, while each group may be semi-autonomous, the wider network may tend to impart control functions over the entire network. In so doing, nodes of the network as a whole may be enabled to communicate with nodes both inside and outside of the particular node's group. However, such systems create further challenges with respect to communicating from the central network to subordinate groups. In particular, in a large network, serial communications may require excessive amounts of time, while multicast communications poses security issues in a secure network, namely that the multicast broadcasting of security management-related messages may tend to make the security system of the network subject to interception and compromise.

Historically, a central hub node has provided a source for the distribution of security infrastructure, such as encryption keys. These security keys have been distributed to coordinating nodes for the groups in the network, which then relay the security infrastructure to the subordinate nodes in the group. If the network links become unreliable for any reason, this distributed relay structure may result in some nodes of the network having out of date security structures, effectively placing them outside of the useful scope of the network. Moreover, the relay structure may result in repeated decryption and re-encryption iterations in order to provide communications between the hub node and the various other nodes of the network.

SUMMARY

A network structure has been developed which provides a network with multiple groups. Each group may incorporate a unique security function for intra-group communications. However, a host node provides a session key to each node in the network for secure intra-group and inter-group multicast communications. The session key thus provides communications across the network without limiting the ability of any node within a group to communicate with any other node within the same group. Thus, groups may not be compromised owing to a failure of wider network security functions.

In various embodiments, the session key is broadcast by multicast transmission. In so doing, the session key can be transmitted quickly and approximately simultaneously to all members of the network while efficiently utilizing the bandwidth of the network. This may tend to reduce latency in transmission and help keep the various nodes of the network on a consistent security system.

In addition, each group may incorporate an intra-group mediator or hub configured to manage the distributed security function within that group. Thus, the network hub would not be required to communicate with each and every node in the network. Rather, the network hub may be configured to communicate a new session key with each intra-group mediator, whereupon the intra-group mediator may be configured to forward session key information on to each node in the group. Because, in such a circumstance, the intra-group mediator may transmit a new session key to group nodes according to the group's own security protocols, the session key may be further secured against being compromised than may be the case with direct distribution from the network hub to the individual nodes.

In an embodiment, a network comprises a plurality of nodes each having a communication module configured to conduct encrypted communication with at least one other communication module, and a plurality of groups, each of the plurality of groups comprising a plurality of the plurality of nodes and each node being a member of only one of the plurality of groups. Each individual node within a particular one of the plurality of groups conducts encrypted communication with another individual node within the particular one of the plurality of groups according to a group key. The network is configured to conduct communication between a node of the particular one of the plurality of groups and a node of another one of the plurality of groups utilizing a session key.

In an embodiment, one of the plurality of nodes of the particular one of the plurality of groups is an intra-group mediator for the particular one of the plurality of groups and configured to initiate transmission of a group key unique to the particular one of the plurality of groups to each of the plurality of nodes of the particular one of the plurality of groups.

In an embodiment, the intra-group mediator initiates transmission of the group key by transmitting a multicast signal including the group key to at least a first node and a second node different from the first node of the plurality of nodes of the particular one of the plurality of groups.

In an embodiment, the group key is transmitted over a designated one of a plurality of channels.

In an embodiment, one of the plurality of nodes of each of the plurality of groups is an intra-group mediator, wherein one of the plurality of nodes is an inter-group mediator different than the intra-group mediator, and wherein the inter-group mediator is configured to communicate with each intra-group mediator of the plurality of groups.

In an embodiment, the session key expires and wherein the inter-group mediator is configured to initiate transmission of a replacement session key to a second intra-group mediator based, at least in part, on an expiration of the session key.

In an embodiment, the session key expires periodically.

In an embodiment, the session key expires when a node joins said network.

In an embodiment, the session key expires when one of the plurality of nodes leaves the network.

In an embodiment, the network is configured to utilize the group key to distribute the session key to each of the plurality of nodes of one of the plurality of groups.

In an embodiment, the intra-group mediator is configured to utilize the group key to distribute the session key to each of the plurality of nodes of the particular one of the plurality of groups corresponding to the intra-group mediator.

In an embodiment, the group key is unique to the particular group.

In an embodiment, each node has an identification characteristic, and wherein the communication module is configured to, at least in part, obscure the identification characteristic from another of the plurality of nodes.

In an embodiment, at least one of the plurality of nodes is configured to manage, at least in part, a composition of at least one of the group key and the session key.

In an embodiment, a network, comprises a plurality of nodes each comprising a processor and a communication module configured to conduct encrypted communication with at least one other communication module, and a plurality of groups, each of the plurality of groups comprising a plurality of the plurality of nodes and each node being a member of only one of the plurality of groups. Each individual node within a particular one of the plurality of groups conduct software-implemented encrypted communication using the individual node's processor with another individual node within the particular one of the plurality of groups according to a group key. The network is configured to conduct software-implemented communication between a node of the particular one of the plurality of groups and a node of another one of the plurality of groups utilizing a session key.

In an embodiment, one of the plurality of nodes of the particular one of the plurality of groups is an intra-group mediator for the particular one of the plurality of groups and configured to initiate transmission of a group key unique to the particular one of the plurality of groups to each of the plurality of nodes of the particular one of the plurality of groups.

In an embodiment, the intra-group mediator initiates transmission of the group key by transmitting a multicast signal including the group key to at least a first node and a second node different from the first node of the plurality of nodes of the particular one of the plurality of groups.

In an embodiment, at least one of the plurality of nodes is configured to manage, at least in part, a composition of at least one of the group key and the session key.

In an embodiment, a method for conducting encrypted communication in a network having a plurality of nodes organized into a plurality of groups comprises the steps of initiating encrypted communication between a first one of the plurality of nodes of a first one of the plurality of groups and a second one of the plurality of nodes of the first one of the plurality of groups different from the first one of the plurality of groups using a group key and initiating encrypted communication between a third one of the plurality of nodes of the first one of the plurality of groups and a fourth one of the plurality of nodes of a second one of the plurality groups different from the first one of the plurality of groups using a session key.

In an embodiment, one of the plurality of nodes of the first one of the plurality of groups is an intra-group mediator for the first one of the plurality of groups, and the method further comprises the step of initiating transmission of the group key unique to the first one of the plurality of groups to each of the plurality of nodes of the first one of the plurality of groups using the intra-group mediator.

In an embodiment, the intra-group mediator initiates transmission of the group key by transmitting a multicast signal including the group key to at least the first node and the second node of the first one of the plurality of groups.

In an embodiment, the initiating transmission of the group key step is accomplished over a designated one of a plurality of channels.

In an embodiment, one of the plurality of nodes of each of the plurality of groups is an intra-group mediator, one of the plurality of nodes is an inter-group mediator different than the intra-group mediator, and the method further comprising the step of communicating with the inter-group mediator with each intra-group mediator of each of the plurality of groups.

In an embodiment, the session key periodically expires, and the method further comprises the step of initiating transmission of a replacement session key with the inter-group mediator based, at least in part, on an expiration of the session key.

In an embodiment, the method further comprises the step of distributing the session key to each of the plurality of nodes of one of the plurality of groups.

In an embodiment, the group key is unique to the first group.

In an embodiment, each node has an identification characteristic, and the method further comprises the step of obscuring the identification characteristic.

In an embodiment, at least one of the plurality of nodes is a server, and the method further comprises the step of managing, at least in part, a composition of at least one of the group key and the session key using the server.

FIGURES

FIG. 4 is a hierarchical network structure; and

DESCRIPTION

Figure 1:
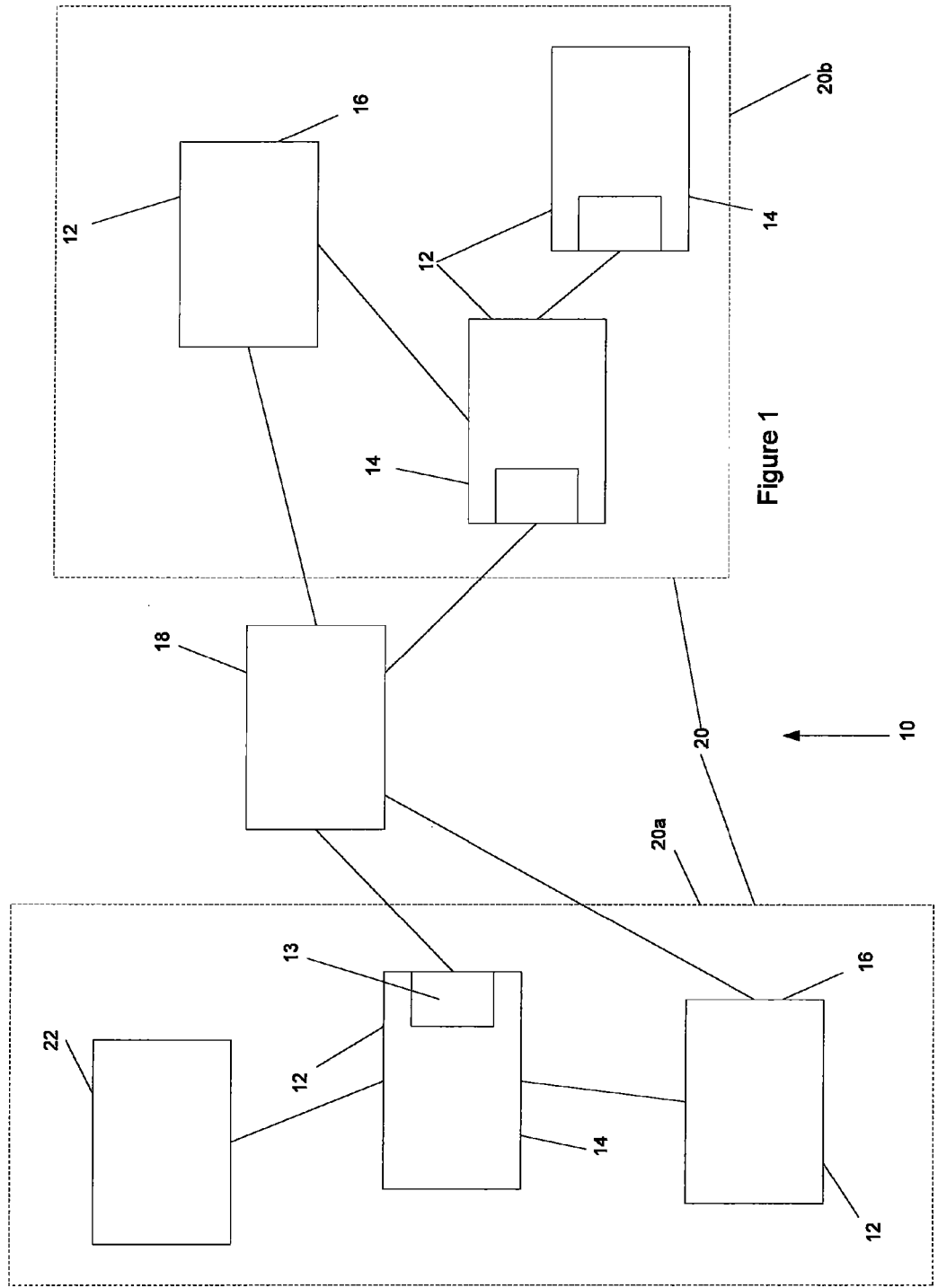
FIG. 1 is network with multiple groups.

FIG. 1 is an exemplary communication network. Network 10 incorporates multiple nodes 12 which incorporate a communication module 13 configured to communicate variably over wireless and wired media. An example of nodes 12 includes peripheral nodes 14, which may be conventional components of network 10 which utilize network resources but which do not contribute to the management of network 10, such as conventional computers and other electronic devices, whether proprietary or off-the-shelf, commercially available products In alternative embodiments, peripheral nodes 14 may be a router, repeater or other component which may serve as a gateway to multiple nodes 12 in a dedicated or otherwise private sub-network.

Nodes 12 may further include administrative nodes, including inter-group mediator nodes 16 and hub node 18. Inter-group mediator node 16 may provide director service of peripheral nodes 14 of group 20 of inter-group mediator node 16 and security mediation for inter-group security. Hub node 18 may incorporate the functionality of an inter-group mediator node 16 as well as a policy server to manage security policy for network 10, which will be discussed in detail below. In various embodiments, inter-group mediator nodes 16 may similarly incorporate policy server functionality, or may be dependent on the policy server of hub node 18.

Nodes 12 are organized into groups 20, such as group 20a and group 20b. As illustrated, each group 20 incorporates multiple nodes 12, including at least one peripheral node 14 and one inter-group mediator node 16. Each node 12 is a member of only one group 20. Each peripheral node 14 within each group 20 is configured to communicate with inter-group mediator node 16 corresponding to peripheral node's 14 group 20, in the illustrated embodiment via a direct communication link or, in alternative embodiments, indirectly through other nodes 12 in the group 20. In addition, peripheral nodes 14 within each group 20, such as group 20b, are configured to communicate with at least some other peripheral nodes 14 within group 20b. In various embodiments, all peripheral nodes 14 within group 20b are configured to communicate peer-to-peer with each other peripheral node 14 within group 20b via direct or indirect communication links.

In various embodiments, each group 20 incorporates a separate security structure. In such embodiments, the security for individual group 20a is conducted according to conventional networking security systems as is well known in the art or which may be developed in the future. For instance, each group 20a, 20b may utilize a public-private key system. In an embodiment, distributed multicast security node 22 may coordinate security for group 20a by generating or holding group keys and distributing the group keys to peripheral nodes 14 of group 20a.

Figure 2:
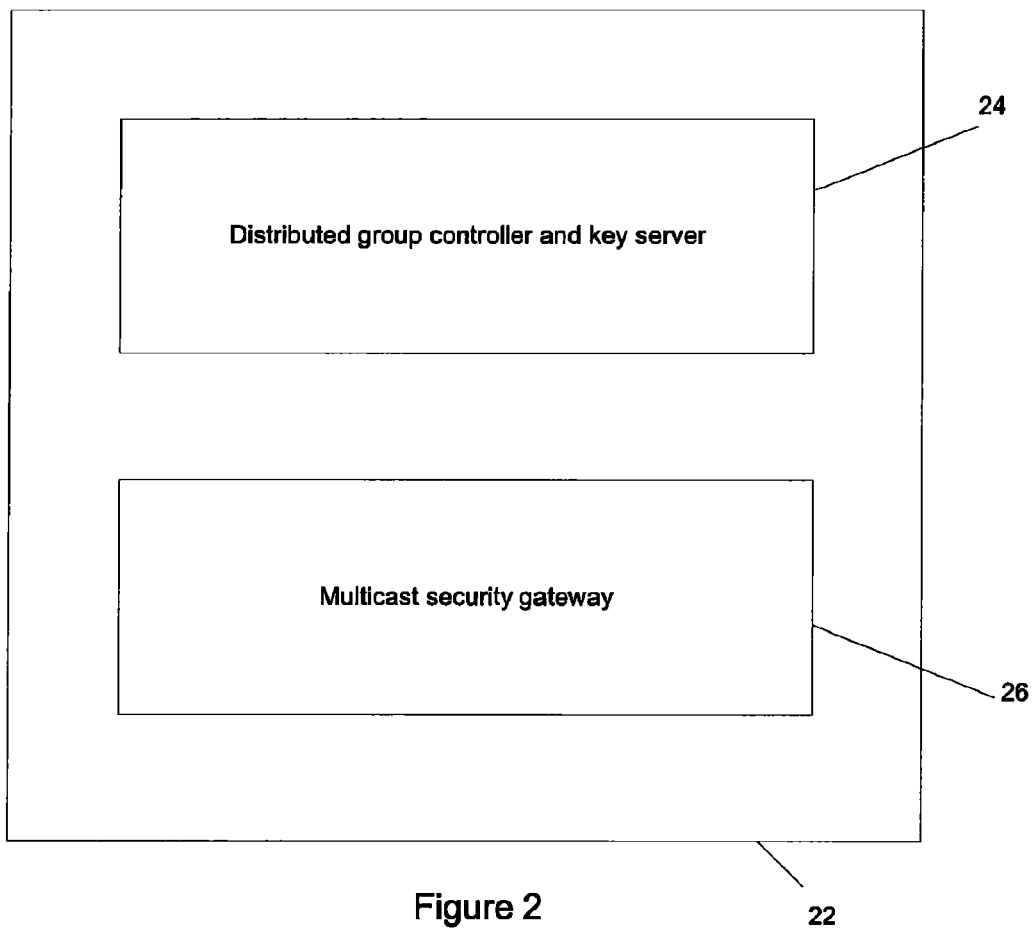
FIG. 2 is a block diagram of a distributed multicast security node.

FIG. 2 illustrates a particular embodiment of distributed multicast security node 22. In such an embodiment, distributed multicast security node 22 incorporates at least two functional blocks, distributed group controller and key server 24 and multicast security gateway 26. Alternatively, distributed group controller and key server 24 and multicast security gateway 26 may be physically or electronically separate nodes. Further alternatively, functionality of key server 24 and multicast security gateway 26 may be incorporated into inter-group mediator node 16.

In the illustrated embodiment, distributed group controller and key server 24 may provide the particular security functions for group 20a. In such an embodiment, distributed group controller and key server 24 communicates with peripheral nodes 14 of group 20a for communication of the group key to peripheral nodes 14. Multicast security gateway 26 may provide the ability of one peripheral node 14 within group 20a to communicate with other peripheral nodes 14 within group 20a, i.e., provides and/or coordinates intra-group communication within group 20a. In an embodiment, this communication is multicast communication.

In order to preserve security within group 20a, multicast security gateway 26 may incorporate one or more techniques in multicast packet handling. In various embodiments, these techniques are configurable dynamically to operate on demand. In an embodiment, an identity of peripheral node 14 which is transmitting information may be anonymized to hide the identity of peripheral node 14 which is transmitting. In an embodiment, multicast security gateway 26 implements a network address translation technique or related technique known in the art to replace the sending peripheral node's 14 address. In so doing, multicast security gateway 26 may obscure the internal membership information of group 20a from outside analysis. Multicast security gateway 26 may further utilize address obfuscation techniques as is well known in the art or which may be developed in the future, such as multicast hopping, to reduce an ability of an analysis of intra-group traffic to infer membership information of group 20a. In various embodiments, some or all of peripheral nodes 14 in group 20a may incorporate multicast security gateway 26.

Figure 3A:
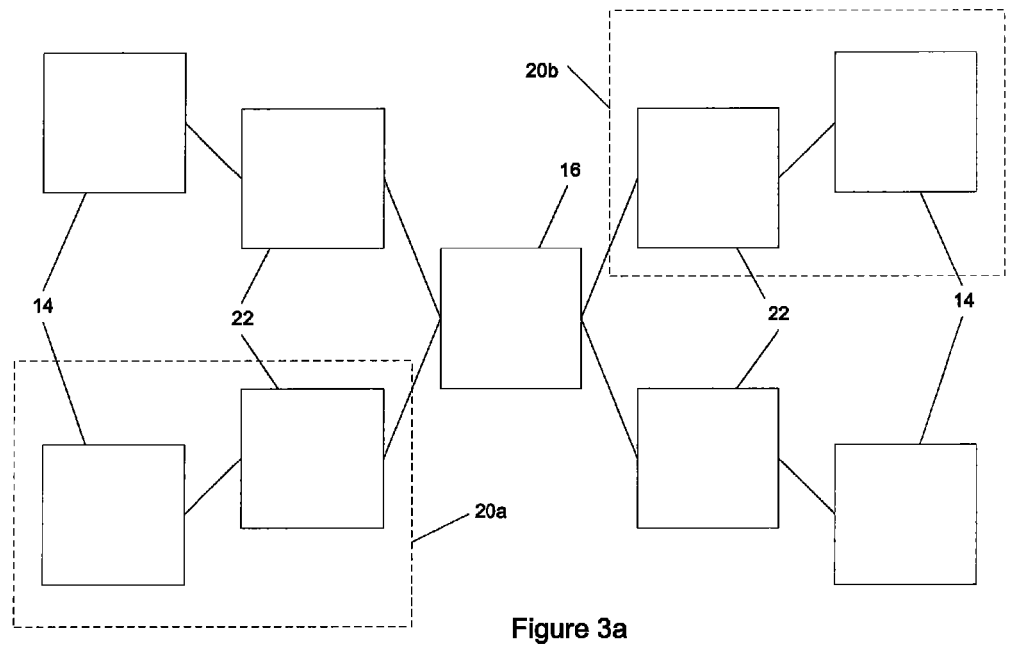
FIGS. 3a-3c are diagrams showing node-to-node communication schemes.
Figure 3B:
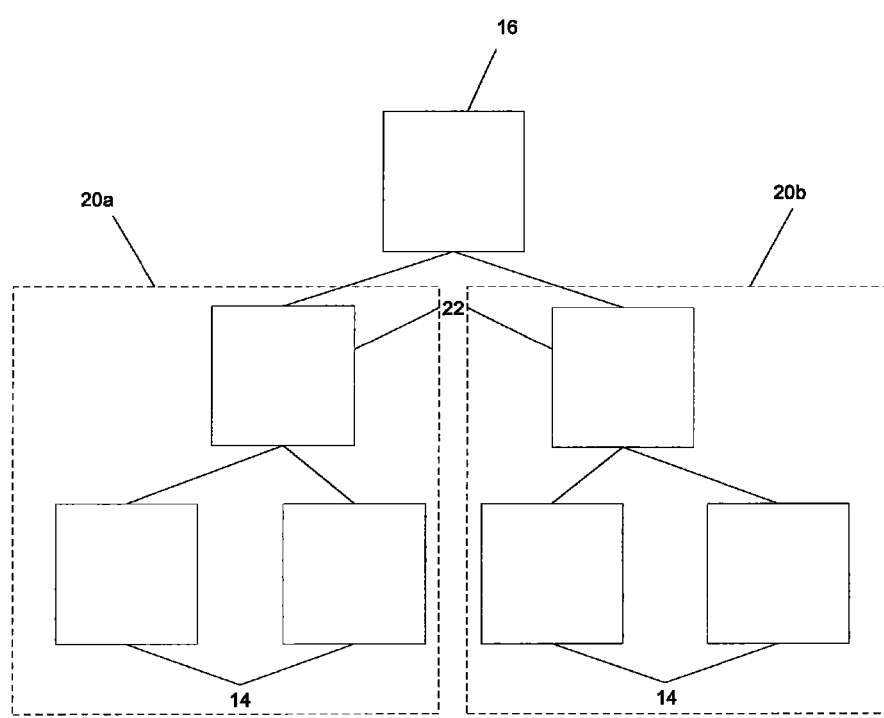
Figure 3C:
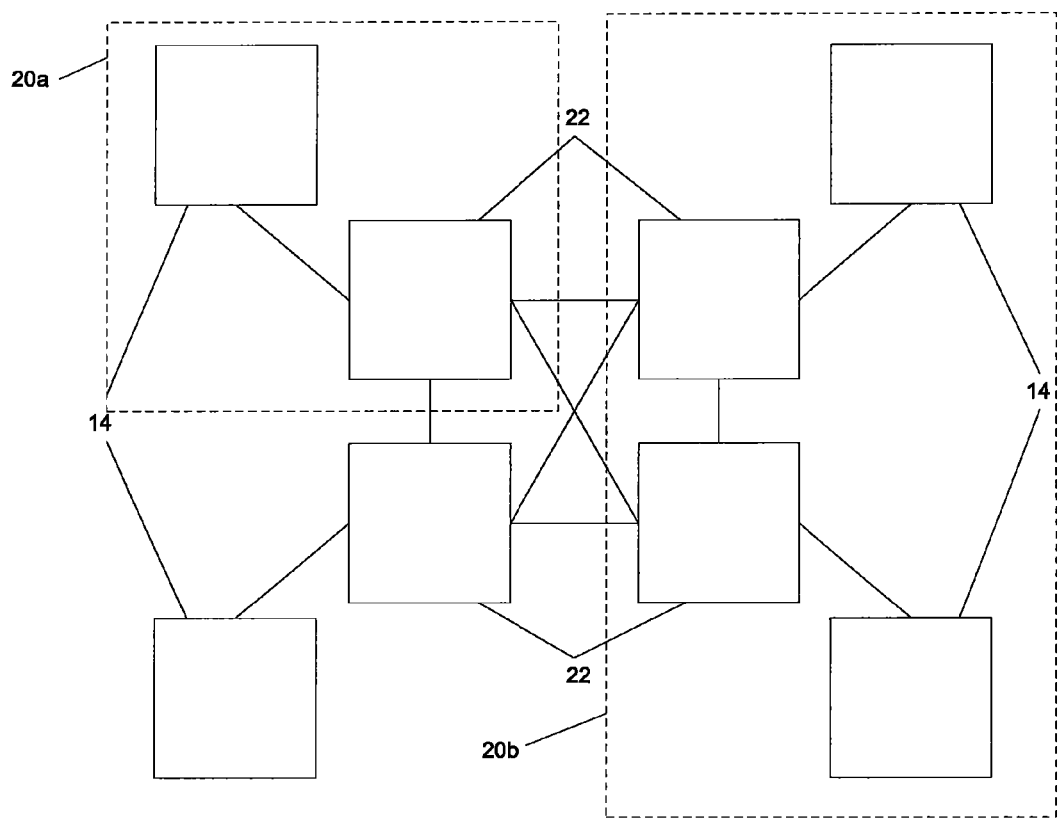

Distributed multicast security node 22 interfaces with inter-group mediator node 16, as illustrated in FIG. 1 by way of peripheral node 14, though in alternative embodiments the communication may be direct, to provide communications from hub 18 to peripheral nodes 14 and communications between peripheral nodes 14 of different groups 20, such as group 20b. FIGS. 3a-3c provide simplified diagrams of different node-to-node coordination schemes. In FIG. 3a, peripheral nodes 14 of one group 20a communicate with other peripheral nodes 14 of group 20b through their respective distributed multicast security nodes 22 by way of inter-group mediator node 16. In such a comparatively simple centralized communication structure, inter-group mediator node 16 is responsible for enabling all inter-group communications in network 10. Alternatively, inter-group mediator node 16 is replaced with hub 18, resulting in hub 18 being responsible for coordinating all communications within network 10.

FIG. 3b is a diagram of a hierarchical centralized network. As illustrated, peripheral nodes 14 communicate by way of distributed multicast security nodes 22 with inter-group mediator node 16. For intra-group communications, inter-group mediator node 16 then forwards information on to other peripheral nodes 14 within group 20a of the sending peripheral node 14. For inter-group communications, inter-group mediator node 16 forwards the message to hub node 18, when then forwards the message to inter-group mediator node 16 of a different group, which then transmits the message to peripheral nodes 14 of group 20b by way of their respective distributed multicast security nodes 22. In various embodiments, multicast security gateway 26 functionality is incorporated into the distributed multicast security node 22 while key management 24 is incorporated into inter-group mediator node 16 as well as distributed multicast security node 22.

FIG. 3c is a diagram of a peer-to-peer network. As illustrated, peripheral nodes 14 are configured to communicate directly with multiple other peripheral nodes 14 by way of their respective distributed multicast security nodes 22. In such embodiments, inter-group mediator node 16 and hub node 18 provide management functions but do not facilitate communications between peripheral nodes 14 directly. As illustrated, FIG. 3c illustrates both intra-group and inter-group communications between peripheral nodes 14, with one group 20a incorporating one peripheral node 14 and another group 20b incorporating multiple peripheral nodes 14. In various embodiments of a peer-to-peer network, a directory service is implemented in a single node 12 or distributed across multiple nodes 12. In such multiple node 12 embodiments, susceptibility to congestion and single point failure may be reduced relative to a single node implementation such as in FIGS. 3a and 3b, though at the potential cost of greater complexity of implementation.

In various embodiments, distributed multicast security nodes 22 provides security policy enforcement for network 10, while the policy server, either as a component of an inter-domain mediator node 16 (FIG. 1) or as a standalone node 12 (32, FIG. 4, below) makes security policy decisions for network 10. Distributed multicast security nodes 22 interact with a policy server to request and install multicast security policies. Distributed multicast security nodes 22 interact with each other directly or through other nodes 12 to coordinate key management. In various embodiments, the policy servers interact with each other securely to coordinate security policies.

In various embodiments, the distributed security architecture provides the capability to quickly configure and reconfigure the security within network 10. When a decision has been made by a user to add or remove a node 12 from a group 20, the distributed multicast security nodes 22 of group 20a may be configured to allow group's 20a multicast segment and its security characteristics to be quickly reconfigured and nodes 12 of group 20a to be quickly re-keyed. Changes to group 20a may thereby be enabled to quickly reflect the user's intent and support the effective operation of network 10, regardless the connectivity to the other domains, such as group 20b. For inter-domain security configuration, inter-group mediator node 16 may provide a directory service and a mediation service for inter-domain security policy coordination among the policy servers and synchronization requests among distributed multicast security nodes 22.

FIG. 4 is a relatively more detailed diagram of network 10 in comparison with FIG. 1. In an embodiment, hub 18 incorporates the functionality of inter-group mediator node 16 and formulates security policy for network 10. Key server 24 of hub 18 generates a session key applicable for conducting multicast transmissions to and among all nodes 12 of network 10. Hub 18 then distributes the session key to nodes 12 according to various modes known in the art. In an embodiment, hub 18 initiates a multicast distribution, sending or attempting to send the session key to all nodes 12 of network 10 in a single broadcast. Alternatively, hub 18 distributes the session key through a multicast broadcast but only to a subset of nodes 12, or serially broadcasts the session key to individual nodes 12.

In embodiments in which hub 18 does not broadcast the session key to all nodes 12 but only a subset of nodes 12, the session key may be broadcast to a joint network node 28a, 28b of each group 20a, 20b, respectively. In various embodiments, each joint network node 28a, 28b performs various conventional intermediary functions, including interfacing directly with hub 18 and other joint network nodes 28a, 28b of other groups 20a, 20b, as the case may be. Inter-group mediator node 16 of group 20a may also interface with joint network node 28a, either as a unique node 12 or with joint network node 28a being a functional component of inter-group mediator node 16. Joint network node 28b is configured to interface with distributed multicast security node 22 which then interfaces with peripheral nodes 14 as described in detail above. Policy server 32a, 32b provides security policy for group 20a, 20b, respectively, as detailed above. In addition, a policy server 32 is a component of hub 18 or, in alternative embodiments, a standalone node 12 unaffiliated with any particular group 20 and which provides and coordinates security policy for network 10 as a whole.

In various embodiments, security for network 10 is implemented as entirely software based, meaning that inter-group mediator nodes 16 and policy servers 32 and the like do not require unique hardware relative to other nodes 12 in network 10, such as peripheral nodes 14. In such embodiments, the software components are configured to run on the existing hardware as known in the art. The major software components in distributed multicast security node 22 are may be implemented as an extension to existing routers so that multicast security can be configured with multicast routing by a user of network 10.

In an embodiment, inter-group mediator nodes 16 are deployed hierarchically within groups 20a, 20b and network 10 as a whole. Such inter-group mediator nodes 16 may be configured to coordinate synchronization requests and the like, as known in the art. It is noted that the group-based structure of network 10 is not limited merely to a single layer of groups within network 10. Rather, group 20b, for instance may be further divided into groups 20, while network 10 itself may function as a group 20 of a larger network 10. In such circumstances, network 10 may retain largely autonomous operational capabilities but may also coordinate with other parallel networks 10.

In various embodiments, network 10 provides confidentiality of membership of each group 20a and 20b resistant to outside network traffic analysis while permitting network analysis from within network 10. Admission control for nodes may be relatively secure but nevertheless dynamic and readily configurable. Group key management may be scalable to nested groups 20 and additional networks 10. Nodes 12 conducting multicast communications may be authenticated to improve confidence and confidentiality of a legitimate origin of a multicast message.

Figure 5:
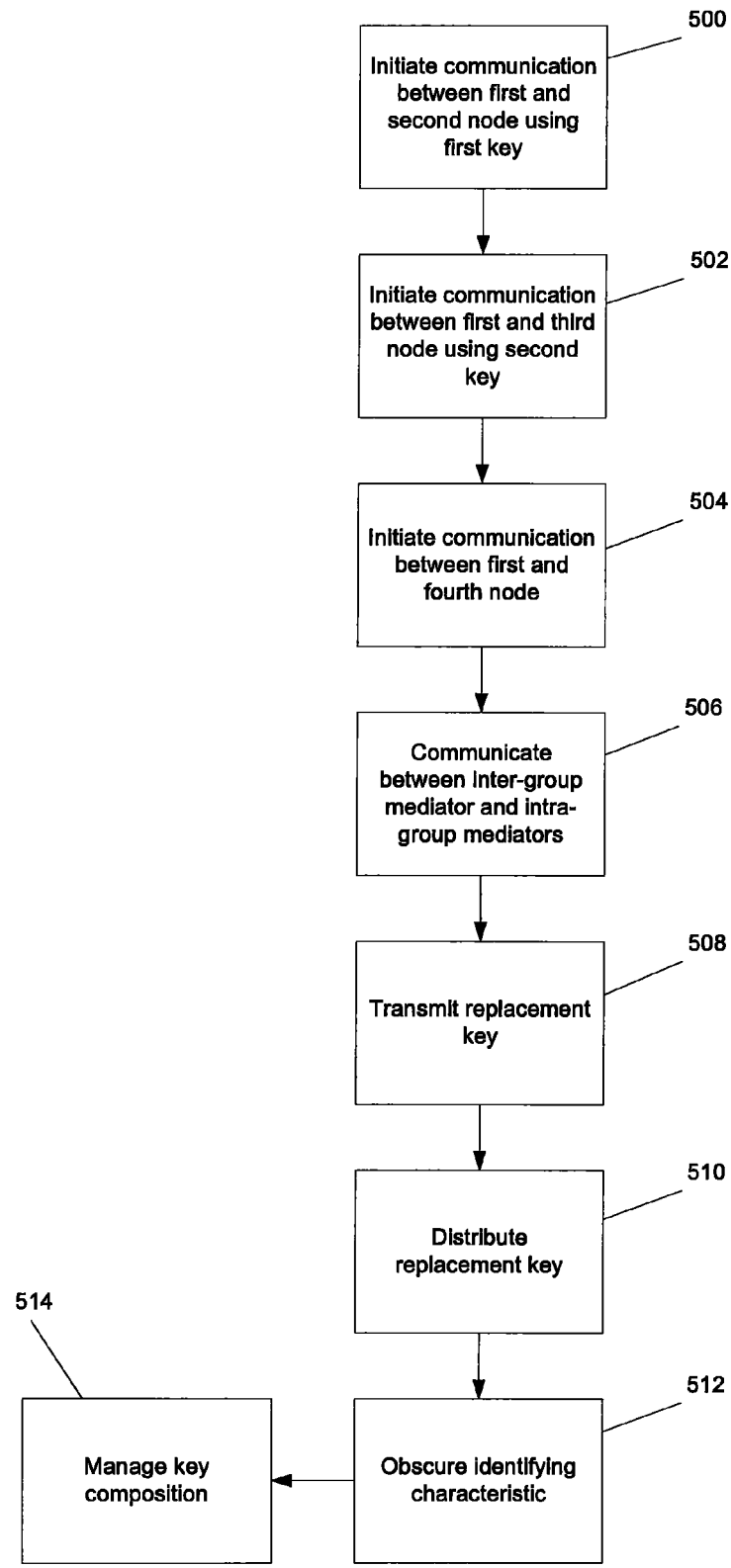
FIG. 5 is a flowchart for providing multicast inter-group security.

FIG. 5 is a flowchart for conducting multicast communication between nodes 12 of network 10. Communications are initiated (500) between a first node 12 and a second node 12 using a first key. In an embodiment, the communication is between hub node 18 and inter-group mediator node 16 and utilizes an encryption key unique to communication between hub node 18 and inter-group mediator node 16 as well known in the art. In some embodiments, the communication (500) is a multicast transmission between hub node 18 and more than one, and in an embodiment all inter-group mediator nodes 16 and includes the distribution of the session key. Then communication is initiated (502) between a first node and a third node utilizing a second key. In certain embodiments, the first node is an inter-group mediator node 16 and another node 12 within a group 20 of inter-group mediator node 16. In various embodiments the communication (502) is a multicast message from inter-group mediator node 16 to multiple nodes 12 of group 20 of inter-group mediator node 16. In an embodiment, at least one distributed multicast security node 22 recites the communication (502), and the communication incorporates a group key for communication within group 20 of inter-group mediator node 16.

Then communication is initiated (504) between the first node and a fourth node, in an embodiment between the inter-group mediator node 16 and another node 12 within network 10. In various embodiments, the communication occurs according to the session key. Alternatively, if the fourth node is within group 20a of inter-group mediator node 16 the communication may occur according to either the session key or the group key for group 20a. In certain embodiments, the session key is utilized to encrypt multicast data across all nodes 12 in all groups 20. In various embodiments, the communication (504) is between two peripheral nodes 14 within network 10 and not necessarily involving inter-group mediator node 16.

In certain embodiments, hub node 18 may function as an inter-group mediator node 16 while nodes labeled inter-group mediator nodes 16 may in fact function as intra-group mediator nodes, which is to say they act to facilitate communications within their respective groups 20a, 20b, but not with other groups 20, leaving inter-group mediation solely to hub node 18. In such embodiments, hub node 18 may initiate (506) communications with inter-group mediator nodes 16 and transmit (508) a replacement session key. Such session key replacement may be periodic or may be initiated by a user or by underlying circumstances, such as the potential compromise of the session key, the introduction of a new node 12 to network 10 or a node 12 leaving network 10. Inter-group mediator nodes 16 may distribute (510) the replacement session key to nodes 12 within inter-group mediator node's 16 group 20. Inter-group mediator node 16 and hub node 18 may obscure (512) identifying characteristics of nodes 12 of network 10 through the transmission (508) and (510) of the replacement session key. Policy servers 32, and particularly policy server 32 of hub node 18, may manage (514) creation of the session key and replacement session key, as well as group keys within groups 20.

What is claimed is:

1. A network, comprising:
   a plurality of nodes each having a communication module configured to conduct encrypted communication with at least one other communication module;
   a plurality of groups, each of said plurality of groups comprising a plurality of said plurality of nodes and each node being a member of only one of said plurality of groups;
   wherein each individual node within a particular one of said plurality of groups conducts encrypted communication with another individual node within said particular one of said plurality of groups according to a group key regardless of connectivity between said plurality of groups; and
   wherein said network is configured to conduct communication between a node of said particular one of said plurality of groups and a node of another one of said plurality of groups utilizing a session key;
   wherein one of said plurality of nodes of said particular one of said plurality of groups is an intra-group mediator for said particular one of said plurality of groups and configured to initiate transmission of a group key unique to said particular one of said plurality of groups to each of said plurality of nodes of said particular one of said plurality of groups;
   wherein one of said plurality of nodes of each of said plurality of groups is an intra-group mediator, wherein one of said plurality of nodes is an inter-group mediator different than said intra-group mediator, and wherein said inter-group mediator is configured to communicate with each intra-group mediator of the plurality of groups; and
   wherein said session key expires and wherein said inter-group mediator is configured to initiate transmission of a replacement session key to a second intra-group mediator based, at least in part, on an expiration of said session key.

2. The network of claim 1 wherein said intra-group mediator initiates transmission of said group key by transmitting a multicast signal including said group key to at least a first node and a second node different from said first node of said plurality of nodes of said particular one of said plurality of groups.

3. The network of claim 2 with said group key being transmitted over a designated one of a plurality of channels.

4. The network of claim 1 wherein said session key expires periodically.

5. The network of claim 1 wherein said session key expires when a node joins said network.

6. The network of claim 1 wherein said session key expires when one of said plurality of nodes leaves said network.

7. The network of claim 1 wherein said network is configured to utilize said group key to distribute said session key to each of said plurality of nodes of one of said plurality of groups.

8. The network of claim 7 wherein said intra-group mediator is configured to utilize said group key to distribute said session key to each of said plurality of nodes of said particular one of said plurality of groups corresponding to said intra-group mediator.

9. The network of claim 1 wherein said group key is unique to said particular group.

10. The network of claim 1 wherein each node has an identification characteristic, and wherein the communication module is configured to, at least in part, obscure said identification characteristic from another of said plurality of nodes.

11. The network of claim 1 wherein at least one of said plurality of nodes is configured to manage, at least in part, a composition of at least one of said group key and said session key.

12. A network, comprising:
    a plurality of nodes each comprising a processor and a communication module configured to conduct encrypted communication with at least one other communication module;
    a plurality of groups, each of said plurality of groups comprising a plurality of said plurality of nodes and each node being a member of only one of said plurality of groups;
    wherein each individual node within a particular one of said plurality of groups conduct software-implemented encrypted communication using said individual node's processor with another individual node within said particular one of said plurality of groups according to a group key regardless of connectivity between said plurality of groups; and
    wherein said network is configured to conduct software-implemented communication between a node of said particular one of said plurality of groups and a node of another one of said plurality of groups utilizing a session key;

wherein one of said plurality of nodes of said particular one of said plurality of groups is an intra-group mediator for said particular one of said plurality of groups and configured to initiate transmission of a group key unique to said particular one of said plurality of groups to each of said plurality of nodes of said particular one of said plurality of groups;

wherein one of said plurality of nodes of each of said plurality of groups is an intra-group mediator, wherein one of said plurality of nodes is an inter-group mediator different than said intra-group mediator, and wherein said inter-group mediator is configured to communicate with each intra-group mediator of each of said plurality of groups; and wherein said session key periodically expires and wherein said inter-group mediator is configured to initiate transmission to said intra-group mediator of a replacement session key based, at least in part, on an expiration of said session key.

13. The network of claim 12 wherein said intra-group mediator initiates transmission of said group key by transmitting a multicast signal including said group key to at least a first node and a second node different from said first node of said plurality of nodes of said particular one of said plurality of groups.

14. The network of claim 13 with said group key being transmitted over a designated one of a plurality of channels.

15. The network of claim 12 wherein said session key expires periodically.

16. The network of claim 12 wherein said session key expires when a node joins said network.

17. The network of claim 12 wherein said session key expires when one of said plurality of nodes leaves said network.

18. The network of claim 12 wherein said network is configured to utilize said group key to distribute said session key to each of said plurality of nodes of one of said plurality of groups.

19. The network of claim 18 wherein said infra-group mediator is configured to utilize said group key to distribute said session key to each of said plurality of nodes of said particular one of said plurality of groups corresponding to said intra-group mediator.

20. The network of claim 12 wherein said group key is unique to said particular group.

21. The network of claim 12 wherein each node has an identification characteristic, and wherein the communication module is configured to, at least in part, obscure said identification characteristic from another of said plurality of groups.

22. The network of claim 12 wherein at least one of said plurality of nodes is configured to manage, at least in part, a composition of at least one of said group key and said session key.

23. A method for conducting encrypted communication in a network having a plurality of nodes organized into a plurality of groups, comprising the steps of:

initiating encrypted communication between a first one of said plurality of nodes of a first one of said plurality of groups and a second one of said plurality of nodes of said first one of said plurality of groups different from said first one of said plurality of groups using a group key regardless of connectivity between said plurality of groups; and initiating encrypted communication between a third one of said plurality of nodes of said first one of said plurality of groups and a fourth one of said plurality of nodes of a second one of said plurality groups different from said first one of said plurality of groups using a session key;

wherein one of said plurality of nodes of said first one of said plurality of groups is an intra-group mediator for said first one of said plurality of groups, and further comprising the step of initiating transmission of said group key unique to said first one of said plurality of groups to each of said plurality of nodes of said first one of said plurality of groups using said intra-group mediator;

wherein one of said plurality of nodes of each of said plurality of groups is an intra-group mediator;

wherein one of said plurality of nodes is an inter-group mediator different than said intra-group mediator; and further comprising the step of communicating with said inter-group mediator with each intra-group mediator of each of said plurality of groups wherein said session key periodically expires; and further comprising the step of initiating transmission of a replacement session key with said inter-group mediator based, at least in part, on an expiration of said session key.

24. The method of claim 23 wherein said intra-group mediator initiates transmission of said group key by transmitting a multicast signal including said group key to at least said first node and said second node of said first one of said plurality of groups.

25. The method of claim 24 wherein said initiating transmission of said group key step is accomplished over a designated one of a plurality of channels.

26. The network of claim 23 wherein said session key expires periodically.

27. The network of claim 23 wherein said session key expires when a node joins said network.

28. The network of claim 23 wherein said session key expires when one of said plurality of nodes leaves said network.

29. The method of claim 23 further comprising the step of distributing said session key to each of said plurality of nodes of one of said plurality of groups.

30. The network of claim 29 wherein said distributing step is conducted by said intra-group mediator configured to utilize said group key to distribute said session key to each of said plurality of nodes of said particular one of said plurality of groups corresponding to said intra-group mediator.

31. The method of claim 23 wherein said group key is unique to said first group.

32. The method of claim 23:

wherein each node has an identification characteristic; and further comprising the step of obscuring said identification characteristic.

33. The method of claim 23 wherein:

at least one of said plurality of nodes is a server; and further comprising the step of managing, at least in part, a composition of at least one of said group key and said session key using said server.

* * * * *